United States Patent
Tanaka

(10) Patent No.: US 7,245,422 B2
(45) Date of Patent: Jul. 17, 2007

(54) RAMAN OPTICAL AMPLIFIER, OPTICAL TRANSMISSION SYSTEM USING THE SAME, AND RAMAN OPTICAL AMPLIFICATION METHOD

(75) Inventor: Tomoto Tanaka, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 72 days.

(21) Appl. No.: 10/873,232

(22) Filed: Jun. 23, 2004

(65) Prior Publication Data

US 2005/0174630 A1    Aug. 11, 2005

(30) Foreign Application Priority Data

Feb. 5, 2004    (JP)    .............. 2004-029254

(51) Int. Cl.
H01S 4/00    (2006.01)
H04B 10/12    (2006.01)

(52) U.S. Cl. .................................... 359/334
(58) Field of Classification Search ................ 359/334
See application file for complete search history.

(56) References Cited

U.S. PATENT DOCUMENTS 5,035,481 A * 7/1991 Mollenauer .................. 398/80
6,292,288 B1 * 9/2001 Akasaka et al. ............ 359/334
6,414,786 B1 * 7/2002 Foursa ........................ 359/334
6,833,947 B2 * 12/2004 Cussat-Blanc et al. ...... 359/334
6,970,650 B2 * 11/2005 Kajiya et al. ................. 398/92
2002/0044335 A1 * 4/2002 Islam et al. ................. 359/334
2002/0075560 A1 * 6/2002 Foursa ........................ 359/334
2003/0053199 A1   3/2003 Akasaka et al. ......... 359/341.3
2003/0058899 A1   3/2003 Islam ........................... 372/6

FOREIGN PATENT DOCUMENTS

JP    2001-44934    2/2001
JP    2003-86871    3/2003
WO    WO 00/49721    8/2000
WO    WO 03/017537    2/2003

* cited by examiner

Primary Examiner—Jack Keith
Assistant Examiner—Eric Bolda
(74) Attorney, Agent, or Firm—Staas & Halsey LLP

(57) ABSTRACT

An amplification medium is inputted thereto first lights and second lights, polarizations of which are orthogonal. A pumping means inputs first pump lights coinciding with the polarization of the first lights, and second pump lights coinciding with the polarization of the second lights to the amplification medium. The gain of a wavelength or wavelength band of a certain light can be efficiently controlled, simply and independently, without affecting the other wavelengths or wavelength bands.

31 Claims, 12 Drawing Sheets

LUMPED RAMAN AMPLIFIER

RAMAN OPTICAL AMPLIFIER, OPTICAL TRANSMISSION SYSTEM USING THE SAME, AND RAMAN OPTICAL AMPLIFICATION METHOD

BACKGROUND OF THE INVENTION (1) Field of the Invention

The present invention relates to a Raman optical amplifier, an optical transmission system using the Raman optical amplifier, and a Raman optical amplification method. Particularly, the present invention relates to a technique suitable for improving optical gain controllability in a specific wavelength or wavelength band.

(2) Description of Related Art

As optical amplifiers used in wavelength division multiplexing transmission systems, well known are an optical amplifier [erbium-doped optical fiber amplifier (EDFA) or the like] doped with a rare earth element, and a Raman optical amplifier exploiting stimulated Raman scattering effect.

WDM signals are heretofore intensively amplified by an EDFA in a repeater amplifier. However, amplification by the EDFA can yield high gain, but generates a relatively large amount of noise components such as ASE (Amplified Spontaneous Emission) light and the like, which is one of factors that limit the transmission distance in the whole system. Namely, even though the optical receiving terminal can receive an optical signal transmitted for a long distance at sufficient level (power), there occurs a phenomenon that the optical receiving terminal cannot normally demodulate the signal because the optical SNR (Signal to Noise Ratio) representing the quality of the received optical signal is poor.

In order to avoid such phenomenon, a Raman optical amplifier is placed before the EDFA, for example, to compensate a part of the transmission loss caused by the optical transmission line (optical fiber) by the Raman optical amplifier, the EDFA then intensively amplifies the optical signal. An advantage of such hybrid configuration, which is a combination of an EDFA and a Raman optical amplifier, is that it can amplify signals with less noise than the EDFA although yielding smaller gain than the EDFA because the Raman optical amplifier is an optical amplifier of a distributed amplification type distributively amplifying optical signals using the optical transmission line. Therefore, the hybrid configuration has an effect of improvement of the optical SNR as compared with a system configured with only the EDFA.

In the WDM transmission system, when the number of repeating amplifiers is increased, the optical SNR in a channel having a low gain is deteriorated, whereas the wavelength in a channel having a high gain is deteriorated due to nonlinear optical effect and the like. Accordingly, it is necessary to keep the optical amplifier gain in each channel constant.

The Raman optical amplifier inputs a plurality of pump lights at different wavelengths to an optical fiber (transmission line fiber), which is a nonlinear medium, to realize wide-band optical amplification that can be applied to a WDM transmission system. Namely, since it is known that the peak of the stimulated Raman scattering effect (Raman gain) generates at a wavelength shifted away from the pump light wavelength toward the longer wavelength by about 100 nm (nanometer) (at frequency of 13.2 THz), a plurality of pump lights at different wavelengths are used to widen the wavelength band that can be used as the main signal wavelength.

As other techniques relating to stimulated Raman scattering effect, there are techniques proposed in patent documents 1 and 2 below.

The technique in the patent document 1 relates to a wavelength division multiplexed optical transmitter. An object of the technique is, in a WDM transmission system using a plurality of wavelength bands, to decrease deterioration of the transmission characteristic due to non-degenerative four wave mixing occurring among signal lights in different wavelength bands, and cross phase modulation, decrease attenuation of signal lights at shorter wavelengths due to stimulated Raman scattering effect, and effectively use the bandwithout generating a dead band when a plurality of signal lights in different wavelength bands are coupled.

According to the technique described in the patent document 1, when a signal light in a short wavelength band (1530–1565 nm) is coupled with a signal light in a long wavelength band (1565–1605 nm) and sent to an optical fiber transmission line, the signal lights are polarization-combined so that the polarizations (directions of electric fields) of the signal lights in the respective wavelength bands are orthogonal. Since the signal light in a short wavelength band and the signal light in a long wavelength band are polarization-combined as above, the dead band at stake generating when a WDM filter is used does not generate, thus effective use of the band becomes possible. It becomes also possible to decrease deterioration of signals due to non-degenerative four wave mixing among the bands or cross phase modulation, and decrease the excessive loss of the signal light in the short wavelength band due to stimulated Raman scattering.

Since a polarization of two signal lights in one wavelength band and a polarization of one signal light on the other wavelength band are orthogonal among three signal lights relating to generation of non-degenerative four wave mixing, the generation efficiency of the non-degenerative four wave mixing becomes one-fourth. Since polarizations of two signal lights relating to cross phase modulation are orthogonal, the generation efficiency of the cross phase modulation becomes two-third. Since a polarization of a pump light and a polarization of a signal light to be amplified are orthogonal, the generation efficiency of stimulated Raman scattering becomes zero. The efficiency of attenuation of signal lights on the shorter wavelength's side due to the stimulated Raman scattering generating in signal lights on the longer wavelength's side is decreased (refer to paragraph 0010–0013 of the patent document 1).

A technique described in the patent document 2 relates to a pump light source unit, a Raman amplifier and an optical transmission system. An object thereof is to provide a structure which can adjust an output signal optical spectrum in an amplifying wavelength band. Any one of a plurality of pump lights is given a variable output pump light wavelength, whereby the pump light spectrum in the Raman amplification wavelength band can be adjusted (refer to paragraphs 0010–0011 of the patent document 2, for example). As shown in FIG. 13 in the patent document 2, two couples of pump lights are polarization-combined by two polarization combiners, respectively, and are depolarized by respective depolarizers to match the state of polarization of the two couples of the pump lights after the two couples of the pump lights are polarization-combined by the two different polarization combiners, whereby the polarization dependency of the Raman amplification gain is reduced (refer to paragraphs 0103–0107 of the patent document 2).

Patent Document 1: Japanese Patent Laid-Open (Kokai) Publication No. 2001-44934

Patent Document 2: Japanese Patent Laid-Open (Kokai) Publication No. 2003-86871

It is very important to realize a wide-band, high-efficient Raman amplifier. When a wide-band amplifier is configured using a plurality of pump lights at different wavelengths as above, the gain is controlled by varying the pump light power or varying the pump light wavelength as done in the technique in the patent document 2.

However, the gain characteristic generally has a certain width (band) with respect to a wavelength. For this, it is difficult to independently control the gain at a wavelength or in a wavelength band of a specific signal light (to control the gain without affecting the wavelength band of another signal light).

When a plurality of pump lights, in which neighboring pump lights are polarization-combined and depolarized in order to reduce the polarization dependency, are used for amplification in a system using a Raman amplifier as done in the patent document 2, the pump light power in the shorter wavelength's side is decreased due to an effect of pump lights at longer wavelength's side.

Further, the Raman effect occurs among the pump lights and the pump light power on the shorter wavelength's side is decreased by an effect of the pump lights in the longer wavelength's side, which causes difficulty with efficient amplification. This can be relieved by polarization-combining the signal light at a longer wavelength and the signal light at a shorter wavelength so that polarizations of the signal lights are orthogonal as described in the patent document 1. However, it is still difficult to independently control the gain at a wavelength or in a wavelength band of a specific signal light. Namely, even if the technique of the patent document 2 is simply applied to the technique of the patent document 1, it is extremely difficult to independently control the gain at a wavelength or in wavelength band of a specific signal light.

SUMMARY OF THE INVENTION

In the light of the above problems, an object of the present invention is to provide a Raman optical amplifier, an optical transmission system using the Raman optical amplifier and a Raman optical amplification method, which can independently control the gain of a wavelength or a wavelength band of a signal light, efficiently and simply, without affecting other wavelengths or wavelength bands.

To achieve the above object, the present invention provides a Raman optical amplifier comprising an amplification medium inputted a first light and a second light polarizations of which are orthogonal or mutually different polarization directions and a pumping means for inputting, to the amplification medium, a first pump light a polarization of which coincides with the polarization of the first light, and a second pump light a polarization of which coincides with the polarization of the second light.

The present invention further provides a Raman optical amplifier comprising an amplification medium inputted a first light group having the same polarization in a first wavelength band and a second light group in a second wavelength band having a polarization orthogonal to the polarization of the first light group, and a pumping means for inputting a first pump light coinciding with the polarization of the first light group, and a second pump light coinciding with the polarization of the second light group to the amplification medium.

The Raman optical amplifier may further comprise a pump light power controlling means for controlling an output power of each of the pump lights. The Raman optical amplifier may still further comprise a polarization controlling means for controlling a polarizing angle formed by the first light and a polarizing angle formed by the second light and the second pump light.

The polarization controlling means may comprise a monitoring unit for monitoring each of the first light group and the second light group in an output light of the amplification medium, and a controlling unit for generating control signals for the polarization controllers on the basis of a result of monitoring by the monitoring unit.

It is preferable that the amplification medium is a polarization maintaining fiber maintaining states of polarization of the first and second lights and the pump lights.

The present invention still further provides an optical transmission system using a Raman optical amplifier comprising an optical transmitting apparatus for transmitting a first light and a second light polarizations of which are orthogonal or mutually different polarization directions, and the Raman optical amplifier comprising an amplification medium inputted the lights from the optical transmitting apparatus, and a pumping means for inputting a first pump light coinciding with a polarization of the first light and a second pump light coinciding with a polarization of the second light to the amplification medium.

The present invention still further provides an optical transmission system using a Raman optical amplifier comprising an optical transmitting apparatus for transmitting a first light group having the same polarization in a first wavelength band, and a second light group in a second wavelength band having a polarization orthogonal to the polarization of the first light group, the Raman optical amplifier comprising an amplification medium inputted the light groups from the optical transmitting apparatus, and a pumping means for inputting a first pump light coinciding with the polarization of the first light group, and a second pump light coinciding with the polarization of the second light group to the amplification medium.

The present invention still further provides a Raman optical amplification method comprising the steps of inputting a first light and a second light, polarizations of which are orthogonal, to an amplification medium, inputting a first pump light coinciding with a polarization of the first light, and a second pump light coinciding with a polarization of the second light to the amplification medium, and controlling gains of the first and second lights by controlling output powers of the pump lights.

The present invention still further provides a Raman optical amplification method for amplifying a light transmitted through an amplification medium by inputting a pump light, the Raman optical amplification method comprising the steps of controlling a polarizing angle formed by the light transmitted through the amplification medium and the pump light to control an amplification gain.

When an angle formed by the polarization of a light transmitted through an amplification medium coincides with the polarization of a pump light, the generation efficiency of stimulated Raman scattering is maximum. From the above fact, according to this invention, by matching the orthogonal polarizations of pump lights and the orthogonal polarizations of lights, it becomes possible to independently control the gain of a wavelength or a wavelength band of a specific light by a pump light power control or a control on a polarizing angle formed by the input light and a pump light, without affecting other wavelengths or wavelength bands.

DESCRIPTION OF THE PREFERRED EMBODIMENTS

[A] Description of First Embodiment

Figure 1:
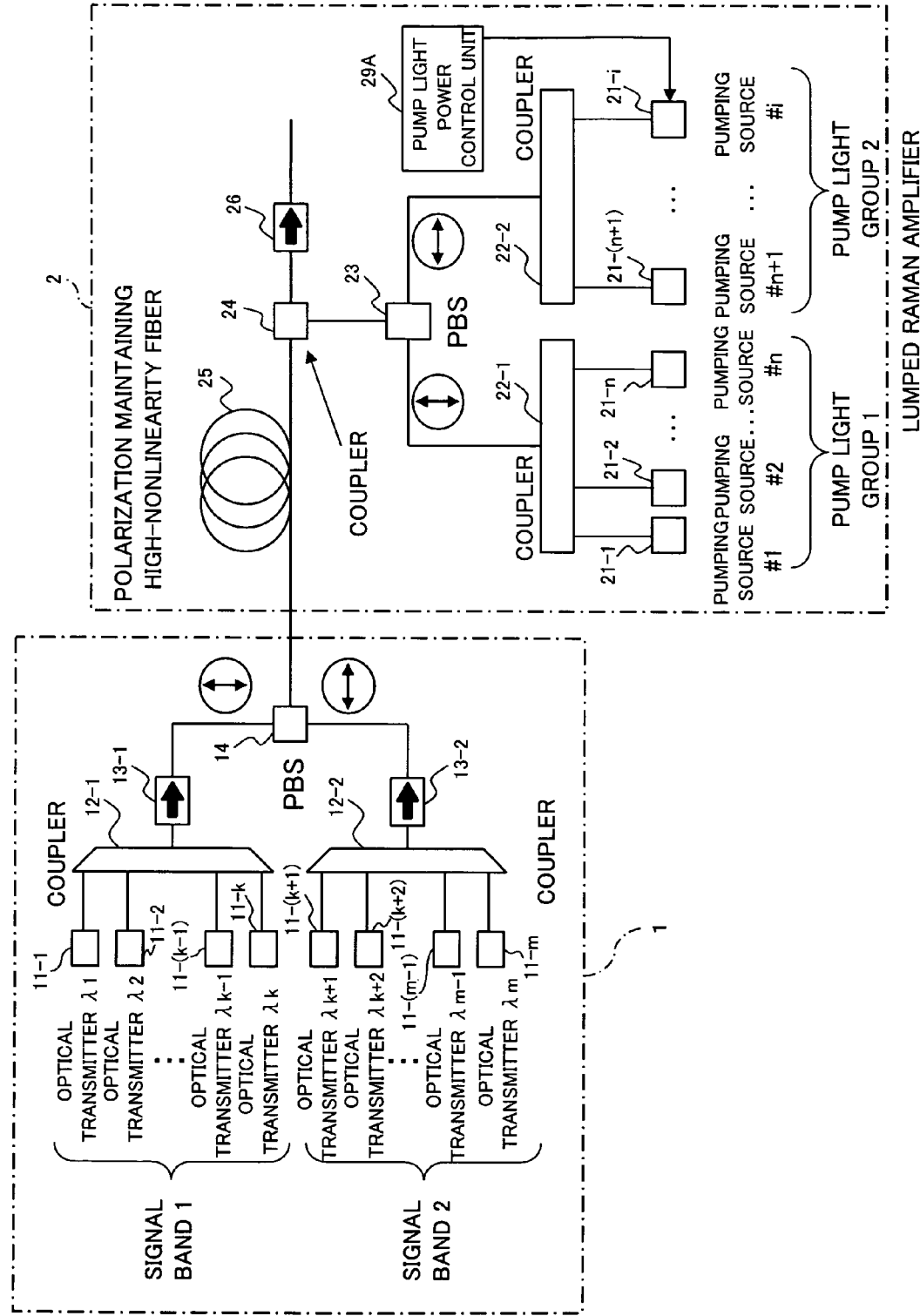
FIG. 1 is a block diagram showing a structure of a WDM transmission system according to a first embodiment of this invention.

FIG. 1 is a block diagram showing a structure of a WDM transmission system according to a first embodiment of this invention. The system shown in FIG. 1 comprises an optical transmission node (optical transmitting apparatus) 1 and a discrete Raman optical amplifier 11. The optical transmission node 1 comprises a plurality of optical transmitters 11-1 through 11-m (m being an integer not smaller than two), two couplers 12-1 and 12-2, two isolators 13-1 and 13-2, and a polarization combiner (PBS: Polarization Beam Splitter) 14. The discrete Raman optical amplifier (hereinafter referred simply to "Raman amplifier") 2 comprises a plurality of pumping sources 21-1 through 21-i (i being an integer not smaller than two), two couplers 22-1 and 22-2, a polarization combiner (PBS) 23, a coupler 24, an optical transmission line (polarization maintaining high-nonlinearity fiber) 25, an isolator 26 and a pump light power control unit 29A.

In the optical transmission node 1, the optical transmitters 11-j (j=1 to m) transmit optical signal lights at different wavelengths. Here, the optical transmitters 11-1 through 11-k (k being an integer satisfying $2 \leq k < m$) are in a group which transmits signal lights (wavelengths $\lambda 1$ to $\lambda k$) having the same polarization in a signal band "1" (first wavelength band), whereas the remaining optical transmitters 11-(k+1) through 11-m are in another group which transmits signal lights (wavelengths $\lambda k+1$ to $\lambda m$) having the same polarization in a different wavelength band "2" (second wavelength band), for example. The polarization of wave (also referred to as polarization of light) of the signal lights (first signal lights) in the signal band "1" and the polarization of wave of the signal lights (second signal lights) in the signal band "2" are set to be orthogonal. Incidentally, the relationship between the signal band "1" and the signal band "2" is that one is a shorter wavelength band, whereas the other is a longer wavelength band, for example.

The couplers 12-1 and 12-2 are provided correspondingly to the signal bands "1" and "2", respectively. The coupler 12-1 couples (wavelength-multiplexes) the signal lights from the optical transmitters 11-1 through 11-k for the signal band "1." The coupler 12-2 couples (wavelength-multiplexes) the signal lights from the optical transmitters 11-(k+1) through 11-m for the signal band "2."

The isolators 13-1 and 13-2 transmit output signal lights (wavelength-multiplexed lights) from the couplers 12-1 and 12-2 in only one direction to prevent feedback lights to the optical transmitters 11-j. The polarization combiner 14 combines the signal lights in the signal bands "1" and "2" while keeping their states of polarization. Since the polarization of the signal lights in the signal band "1" and the polarization of the signal lights in the signal band "2" are set to be orthogonal as stated above, the signal lights in the signal bands "1" and "2" are combined while keeping their orthogonal state, and outputted to the optical transmission line 25. Here, a polarization maintaining high-nonlinearity fiber 25, which keeps the state of polarization of the signal lights to be transmitted and is less affected by the nonlinear effect, is used as the optical transmission line 25, whereby the signal lights in the signal bands "1" and "2" can be transmitted with low loss while keeping their polarizations (while keeping the above orthogonal state).

In the Raman amplifier 2, the pumping sources 21-p (p=1 to i) output pump lights #p for Raman amplification at different wavelengths. Here, pump lights #1 through #n (pump light group "1": first pump light group) from the pumping sources 21-1 through 21-n (n being an integer satisfying $2 \leq n < i$) cover the signal band "1" with their gain characteristics (gain bands) to amplify the signal lights in the signal band "1," whereas pump lights #n+1 through #i from the remaining pumping sources 21-(n+1) through 21-i cover the signal band "2" with their gain bands to amplify the signal lights in the signal band "2," for example.

Namely, the state of polarization of the signal band "1" and the state of polarization of the signal band "2" are set so that the polarization of the signal lights in the signal band "1" and the polarization of the pump lights #1 through #n in the pump light group "1" coincide with each other, and the polarization of the signal lights in the signal band "2" and the polarization of the pump lights #n+1 through #i in the pump light group "2" coincide with each other. Each of wavelength bands of the pump light groups "1" and "2" is set to an optimum wavelength band (for example, a band shifted toward the shorter wavelength by about 13.2 THz (100 nm) away from each of the signal bands "1" and "2") according to each of the signal bands "1" and "2" to be amplified.

The couplers 22-1 and 22-2 are disposed correspondingly to the pump light groups "1" and "2," respectively. The coupler (first coupler) 22-1 couples the pump lights from the pumping sources 21-1 through 21-n constituting the pump light group "1." The coupler (second coupler) 22-2 couples the pump lights from the pumping sources 21-(n+1) through 21-i constituting the pump light group "2."

The polarization combiner 23 combines output lights from the couplers 22-1 and 22-2 while keeping their polarization states, that is, their orthogonal state. The combined pump lights are introduced to the polarization maintaining high-nonlinearity fiber 25 (hereinafter referred simply to polarization maintaining fiber 25), which is a transmission line of the signal lights and is a Raman amplification medium, by the coupler (third coupler) 24, and transmitted within the polarization maintaining fiber 25 toward the optical transmission node 1 while keeping their orthogonal state.

The isolator 26 prevents feedback light to the polarization maintaining fiber 25. The pump light power control unit 29A can control an output power (pump light power) of each of the pumping sources 21-1 through 21-i.

Figure 2:
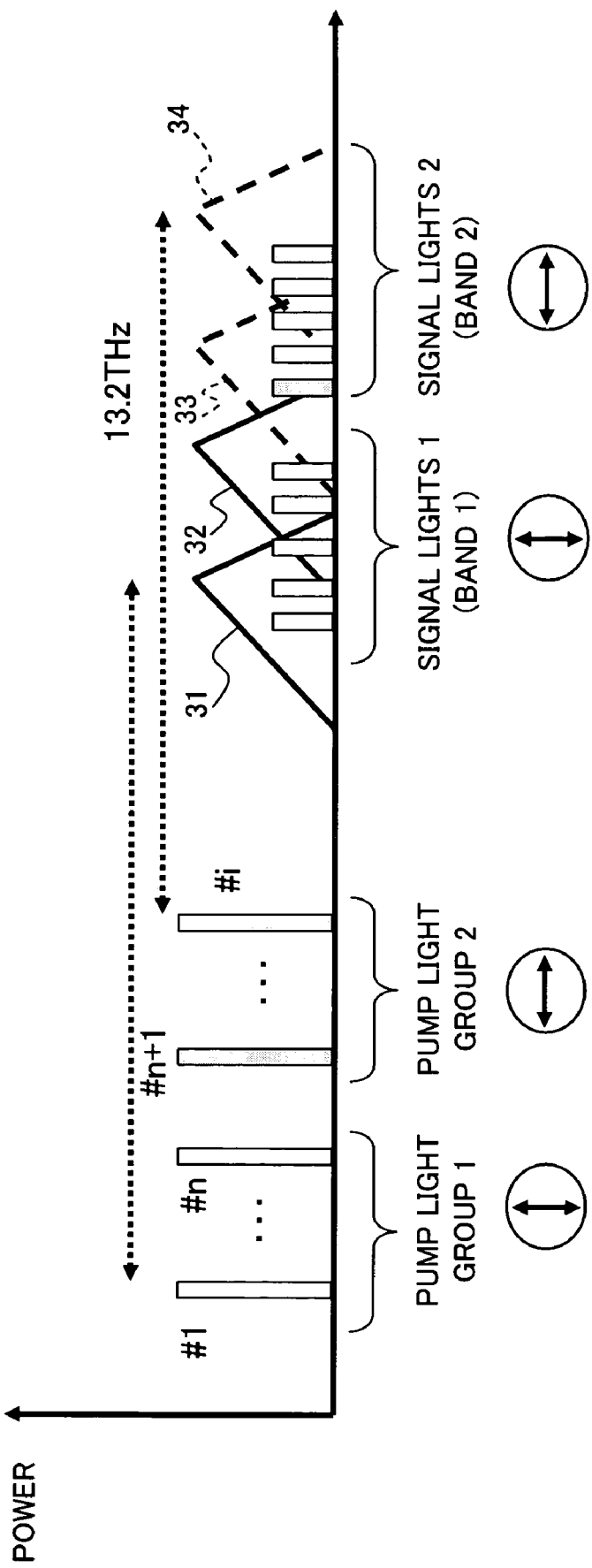
FIG. 2 is a schematic diagram showing an example of wavelength arrangement of signal lights and pump lights and a state of polarization thereof in the WDM transmission system shown in FIG. 1.

In the WDM transmission system structured as above, a gain band having the gain peak caused by the stimulated Raman scattering effect is generated at a position shifted away from each of the pump light groups "1" and "2" toward the longer wavelength's side by about 13.2 THz (100 nm) in the polarization maintaining fiber 25, as schematically shown in FIG. 2, for example. Whereby, each of the signal lights in the signal band "1" is amplified efficiently owing to the stimulated Raman scattering effect of the pump light group "1" whose polarization state coincides therewith, whereas each of the signal lights in the signal band "2" is amplified efficiently owing to the stimulated Raman scattering effect of the pump light group "2" whose polarization state coincides therewith.

At this time, the polarization of the pump light group "1" ("2") and the polarization of the signal band "2" ("1") are in the orthogonal state, according to this embodiment. Therefore, the generation efficiency of the stimulated Raman scattering caused by the pump light group "1" ("2") becomes zero at the signal lights in the signal band "2" ("1"), thus the signal lights in the signal band "2" ("1") are free from the effect, according to this embodiment. In FIG. 2, a solid line 31 represents the gain characteristic of the pump light #1, a solid line 32 the gain characteristic of the pump light #n, a broken line 33 the gain characteristic of the pump light #n+1, and a broken line 34 the gain characteristic of the pump light #i, each of which signifies that the gain characteristic has a width (band) spreading from the peak value of the Raman gain.

Figure 3:
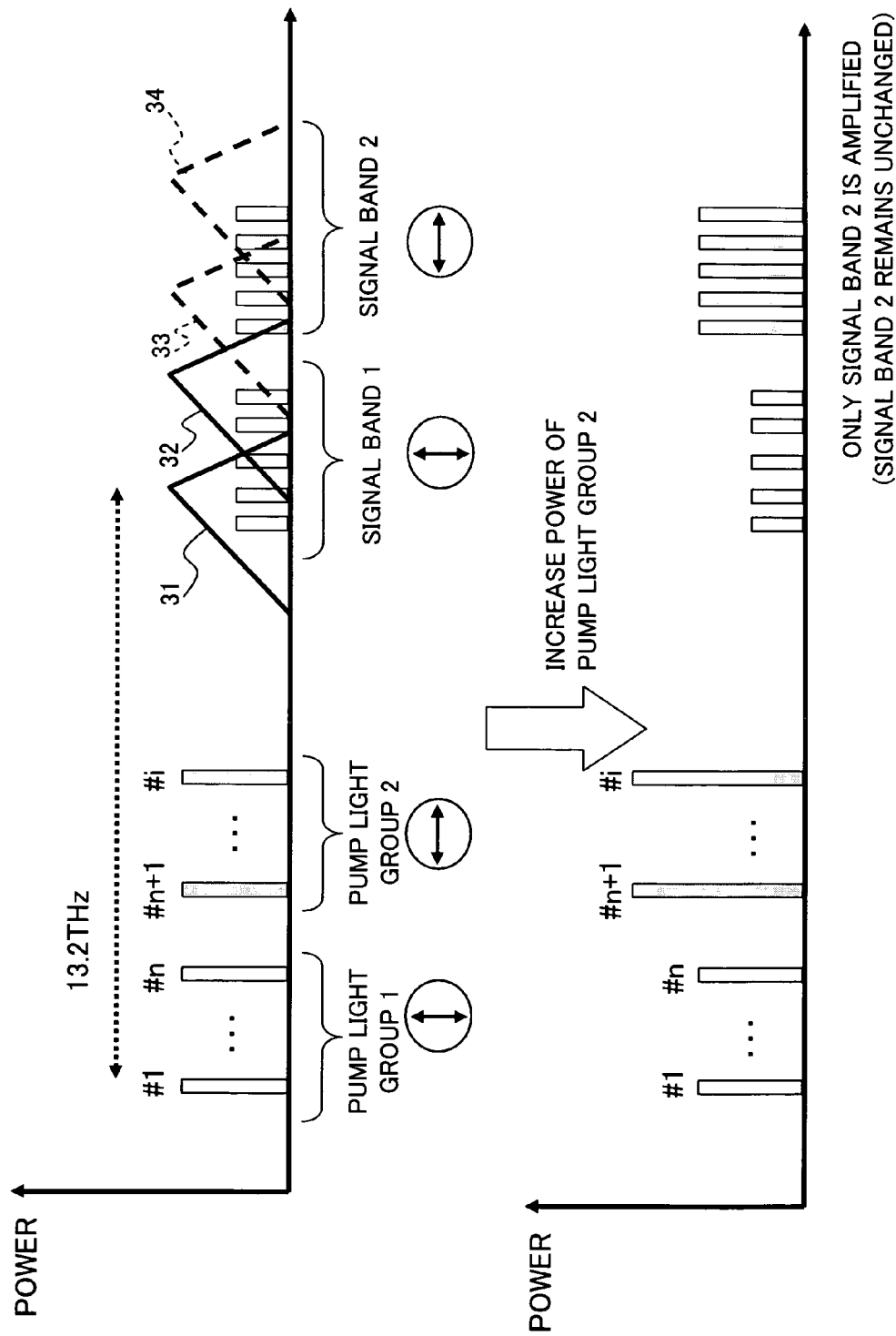
FIG. 3 is a schematic diagram showing an example of a change in gain characteristic by a pump light power control in the WDM transmission system shown in FIG. 1.

As schematically shown in FIG. 3, when the pump light power control unit 29A controls (increases) the pump light power of the pump light group "2" in this situation, the generation efficiency of the stimulated Raman scattering becomes zero in an overlapped portion between gain characteristics (gain bands) 33 and 34, and the signal band "1" because the polarization of the pump light group "2" and the polarization of the signal lights in the signal band "1" are orthogonal even though the overlapped portion occurs. Accordingly, it becomes possible to efficiently control (increase or decrease) only the gain of each of the signal lights in the signal band "2" without changing the gain of each of the signal lights in the signal band "1." Conversely, it becomes possible to efficiently control only the gain of each of the signal lights in the signal band "1" by controlling the pump light power of the signal light group "1."

The pump light power control by the pump light power control unit 29A may be performed according to external setting from a maintenance console or the like. Alternatively, output lights in each of the signal band "1" and "2" from the Raman amplifier 2 may be monitored, and the pump light power control may be performed automatically and adaptively according to a result of the monitoring.

(A 1) Description of Modification

Figure 4:
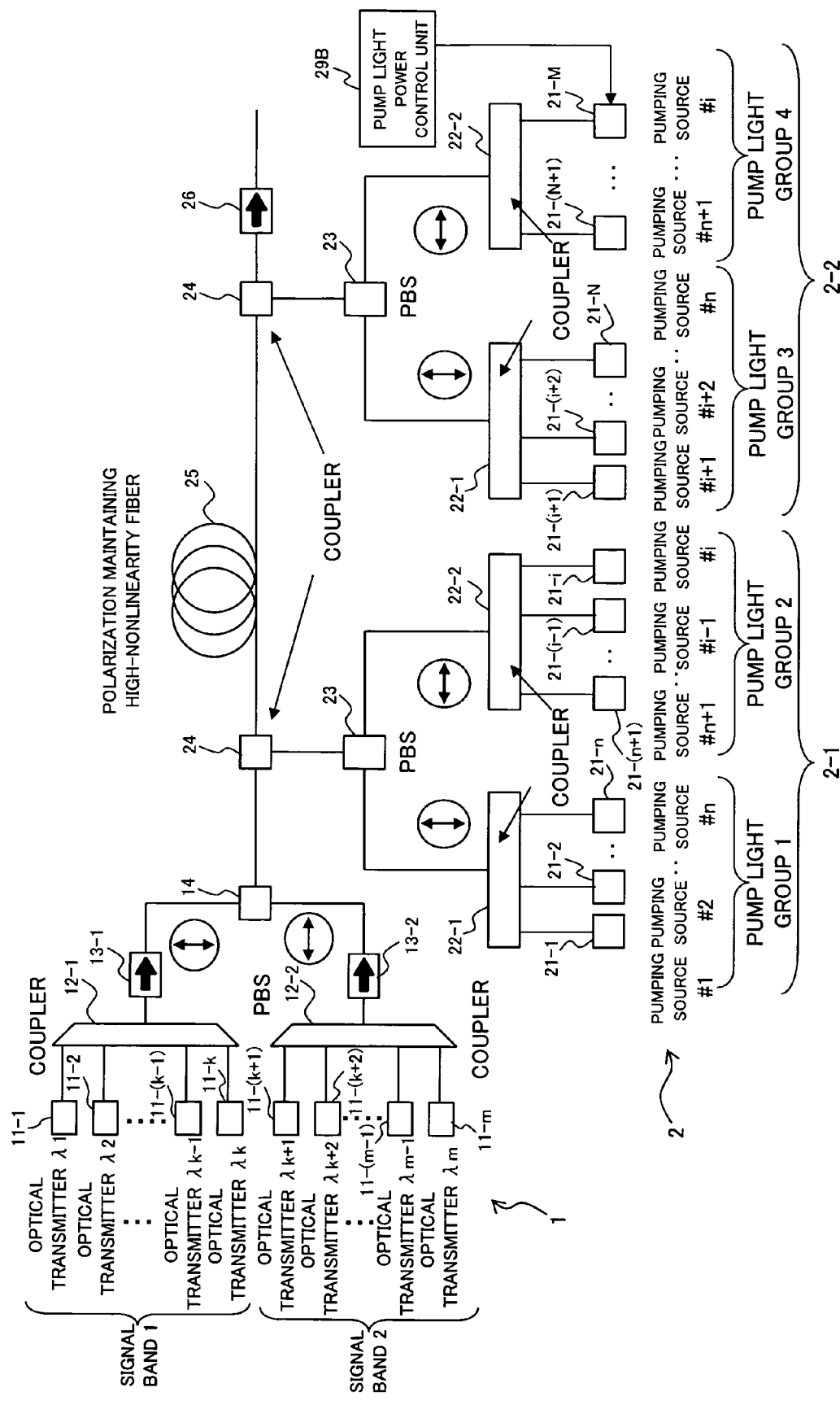
FIG. 4 is a block diagram showing a structure of a WDM transmission system according to a modification of the first embodiment.

FIG. 4 is a block diagram showing a structure of a WDM transmission system according to a modification of the above-described first embodiment. The system shown in FIG. 4 corresponds to a structure of the Raman amplifier 2 when it has bidirectional pumping.

The Raman amplifier 2 shown in FIG. 4 comprises, as an upstream-side pumping source unit 2-1 introducing a plurality of pump lights #1 through #i (i being an integer not smaller than two) for Raman amplification from the upstream side of the polarization maintaining fiber 25, a plurality of pumping sources 21-1 through 21-i, two couplers 22-1 and 22-2, a polarization combiner (PBS) 23 and a coupler 24, while comprising, as a downstream-side pumping source unit 2-2 introducing a plurality of pump lights #i+1 through #M (M being an integer not smaller than i+2) for Raman amplification from the downstream-side of the polarization maintaining fiber 25, a plurality of pumping sources 21-(i+1) through 21-M, two couplers 22-1 and 22-2, a polarization combiner (PBS) 23 and a coupler 24.

In this case, the signal band is divided into two signal bands "1" and "2." In each of the pumping source units 2-1 and 2-2, pumping sources 21-i (J=1 to M) is divided into two groups. The states of polarization of the signal bands "1" and "2", and the pump light groups "1," "2," "3" and "4" are set, and the pump wavelength #j of each of the pumping sources 21-j is set so that signal lights in the signal band "1" are amplified high efficiently with pump light groups "1" (pumping sources 21-1 to 21-n) and "3" [pumping sources 21-(i+1) to 21-N], whereas signal lights in the signal band "2" are amplified highly efficiently with the pump light group "2" [pumping sources 21-(n+1) to 21-i] and "4" [pumping sources 21-(N+1) to 21-M].

In other words, the pump wavelength #j of each of the pumping sources 21-J is set so that the polarization of the signal lights in the signal band "1" and the polarization of the pump light groups "1" and "3" coincide with each other, whereas the polarization of the signal lights in the signal band "2," which is orthogonal to the polarization of the signal lights in the signal band "1," coincides with the polarization of the pump light groups "2" and "4". In FIG. 4, a reference character 29B denotes a pump light power control unit which can control a pump light power of each of the pumping sources 21-1 through 21-M, and structural elements denoted by like reference characters designate like or corresponding parts described above.

In the WDM transmission system structured as above according to this modification, by controlling the pump light power of either one or the both of the pump light groups "1" and "3" by the pump light power control unit 29B, it becomes possible to independently control (increase or decrease) only the gain of each of the signal lights in the signal band "1." Similarly, by controlling the pump light power of either one or the both of the pump light groups "2" and "4", it becomes possible to independently control only the gain of each of the signal lights in the signal band "2."

In this example, the pump light power control by the pump light power control unit 29B may be performed according to external setting from a maintenance console or the like. Alternatively, an output light in each of the signal band "1" and "2" from the Raman optical amplifier 2 may be monitored, and the pump light power control may be performed automatically and adaptively according to a result of the monitoring.

(B) Description of Second Embodiment

Figure 5:
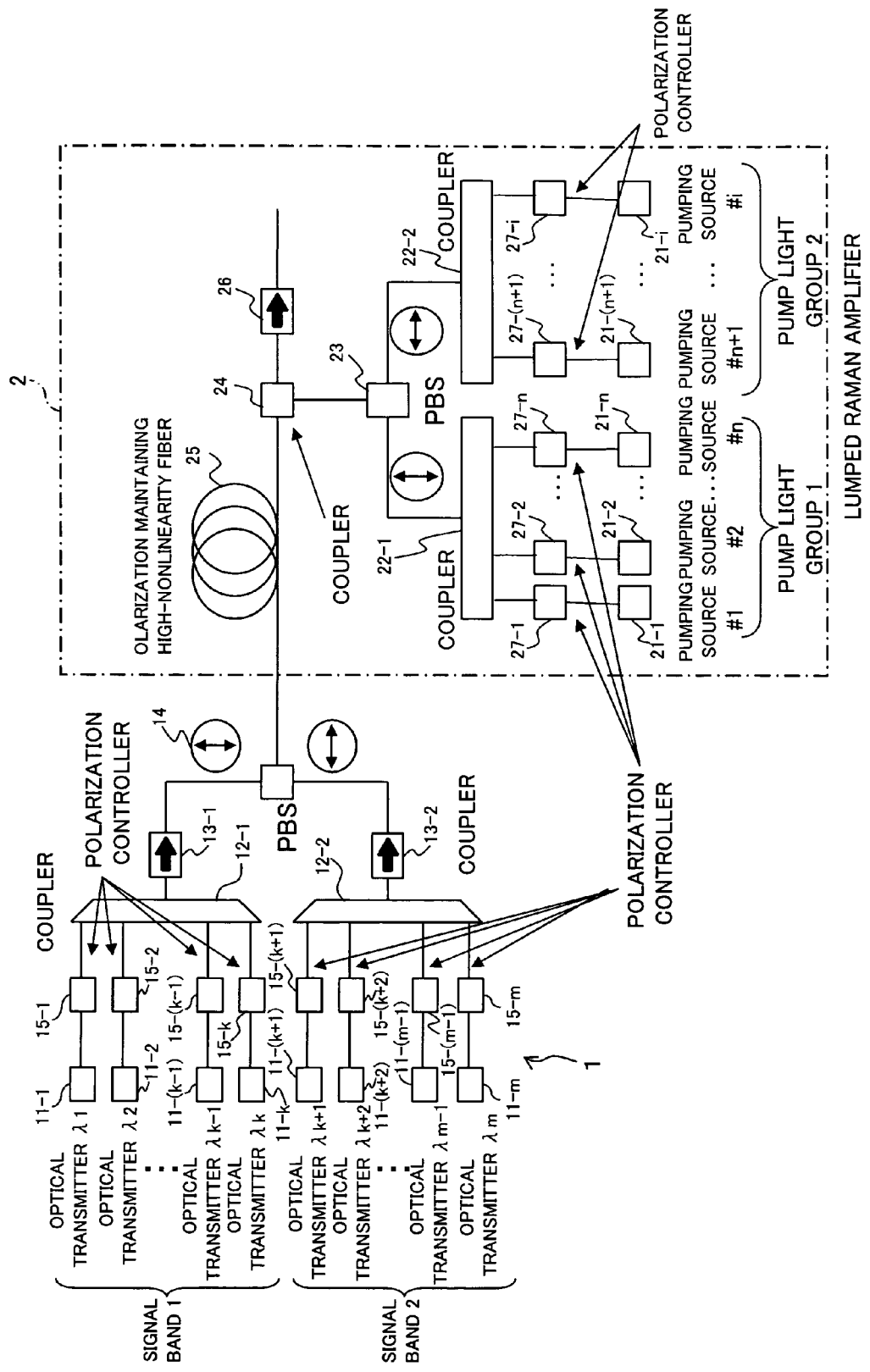
FIG. 5 is a block diagram showing a structure of a WDM transmission system according to a second embodiment of this invention.

FIG. 5 is a block diagram showing a structure of a WDM transmission system according to a second embodiment of this invention. The WDM transmission system shown in FIG. 5 differs from the system described above with reference to FIG. 1 in that, in the optical transmission node 1, there are provided polarization controllers 15-1 through 15-m to adjust the states of the polarization of signal lights outputted from the respective optical transmitters 11-1 through 11-m before the signal lights are coupled by the couplers 12-1 and 12-2, and, in the Raman amplifier 2, there are provided polarization controllers 27-1 through 27-i to adjust pump lights #1 through #n and #n+1 through #i from the respective pumping sources 21-1 through 21-n and 21-(n+1) through 21-i before the pump lights are coupled by the couplers 22-1 and 22-2. The other components are identical or similar to those described above unless specifically mentioned.

In this case, the signal lights outputted from the optical transmitters 11-1 through 11-m are divided into a signal band "1" and a signal band "2," states of polarization of which are orthogonal, as initial setting. Arrangement of wavelengths of the signal lights and the pump lights, and the polarization states of the signal lights and the pump lights #p are set so that the signal lights (first signal lights) in the signal band "1" are amplified highly efficiently with pump lights #1 through #n (first pump light group "1") from pumping sources (first pumping sources) 21-1 through 21-n, whereas the signal lights (second signal lights) in the signal band "2" are amplified highly efficiently by the remaining pumping sources (second pumping sources) 21-(n+1) through 21-i.

Figure 6:
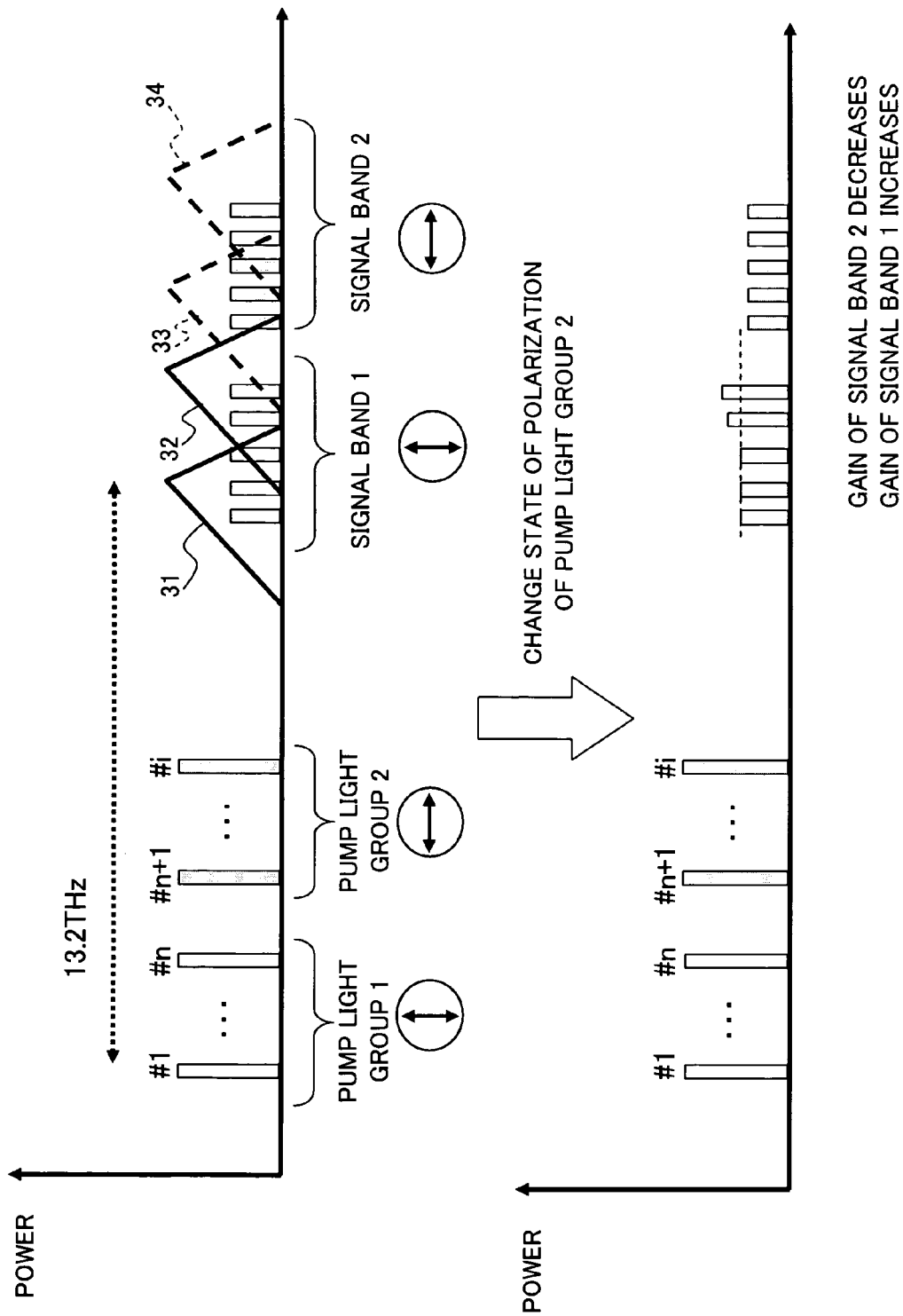
FIG. 6 is a schematic diagram showing an example of a change in gain characteristic by a pump light polarization control in the WDM transmission system shown in FIG. 5.

As schematically shown in FIG. 6, each of the states of polarization of the signal bands "1" and "2," and the pump light groups "1" and "2" is set (adjusted) so that the polarization of the signal lights in the signal band "1" and the polarization of the pump lights #1 through #n in the pump light group "1" are matched with each other, whereas the polarization of the signal lights in the signal band "2" and the polarization of the pump lights #n+1 through #i in the pump light group "2" are matched with each other. Each of wavelength bands (pump light wavelengths) of the pump light groups "1" and "2" is set to an optimum wavelength band [for example, a band shifted away from the signal band "1" or "2" toward the shorter wavelength's side by about 13.2 THz (100 nm) ] according to the signal band "1" or "2" to be amplified.

In the WDM transmission system structured as above according to this embodiment, either or both the polarization controllers 15-j (j=1 to m) in the optical transmission node 1 and the polarization controllers 27-p (p=1 to i) in the Raman amplifier 2 are controlled to adjust the polarization state of either or both of the signal bands and the pump light groups. Whereby, the polarizing angle formed by the signal light and the pump light in the signal bands "1" or "2" is controlled to intensively increase the gain of the signal light in the signal band "1" or "2." Accordingly, it is possible to control to decrease (or not to vary) the gain of each of the signal lights in the signal band "1" or "2."

As schematically shown in the lower part in FIG. 6, for example, when the state of polarization of the pump lights #n+1 through #i in the pump light group "2" is controlled by the polarization controllers 27-(n+1) through 27-i to change the state of polarization of the pump light group "2" and the signal band "2" from the coincident state by a predetermined quantity, the generation efficiency of the stimulated Raman scattering in the signal band "2" is decreased. According to it, the gain of each of the signal lights in the signal band "2" is decreased. At this time, the orthogonal relationship of the polarization between the signal band "1" and the pump light group "2" is changed, thus the generation efficiency of the stimulated Raman scattering in signal lights in the signal band "1" at wavelength positions within the gain characteristic (gain band) 33 of the pump light group "2" does not become zero. This results in an increase in the gain of the signal lights (a part or all) in the signal band "1". In other words, when the wavelength positions of the signal lights in the signal band "1" and the pump light group "2" are set so that the signal lights in the signal band "1" are free from an effect by the gain characteristic 33 of the pump light group "2", the gain of each of the signals in the signal band "1" remains unchanged.

Reversely, when the state of polarization of the pump lights #1 through #n in the pump light group "1" is controlled by the polarization controllers 27-1 through 27-n to change the polarization of the pump light group "1" from a state in which it coincides with the polarization of the signal band "1" by a predetermined quantity, the gain of each of the signal lights in the signal band "1" is decreased according to it, whereas the gain of the signal lights in the signal band "2" within the gain characteristic (gain band) 32 is increased (or remains unchanged) due to the pump light group "1."

By controlling the polarization of the signal lights in the signal band "1" or "2" by the polarization controllers 15-1 through 15-k or the polarization controllers 15-(k+1) through 15-m to change the polarization of the pump light group "1" or "2" from the state in which the polarization of the signal lights coincides with the polarization of the pump light group "1" or "2", it is possible to decrease the gain of the signal lights in one signal band "1" or "2", while increasing (or not change) the gain of the signal lights in the other signal band "2" or "1."

Namely, the polarization controllers 27-1 through 27-i and 15-1 through 15-m fulfill a function as a polarization controlling means for controlling each polarizing angle formed by a signal light (first or second signal light) and a corresponding pump light (first or second pump light).

According to the second embodiment, the polarizing angle formed by the polarization of a signal light in a certain signal band and the polarization of a pump light amplifying the signal light is controlled to break the agreement or the orthogonal relationship of polarization between the signal light and pump light, whereby the gain of a signal light within a specific signal band can be simply controlled.

(B1) Description of First Modification

Figure 7:
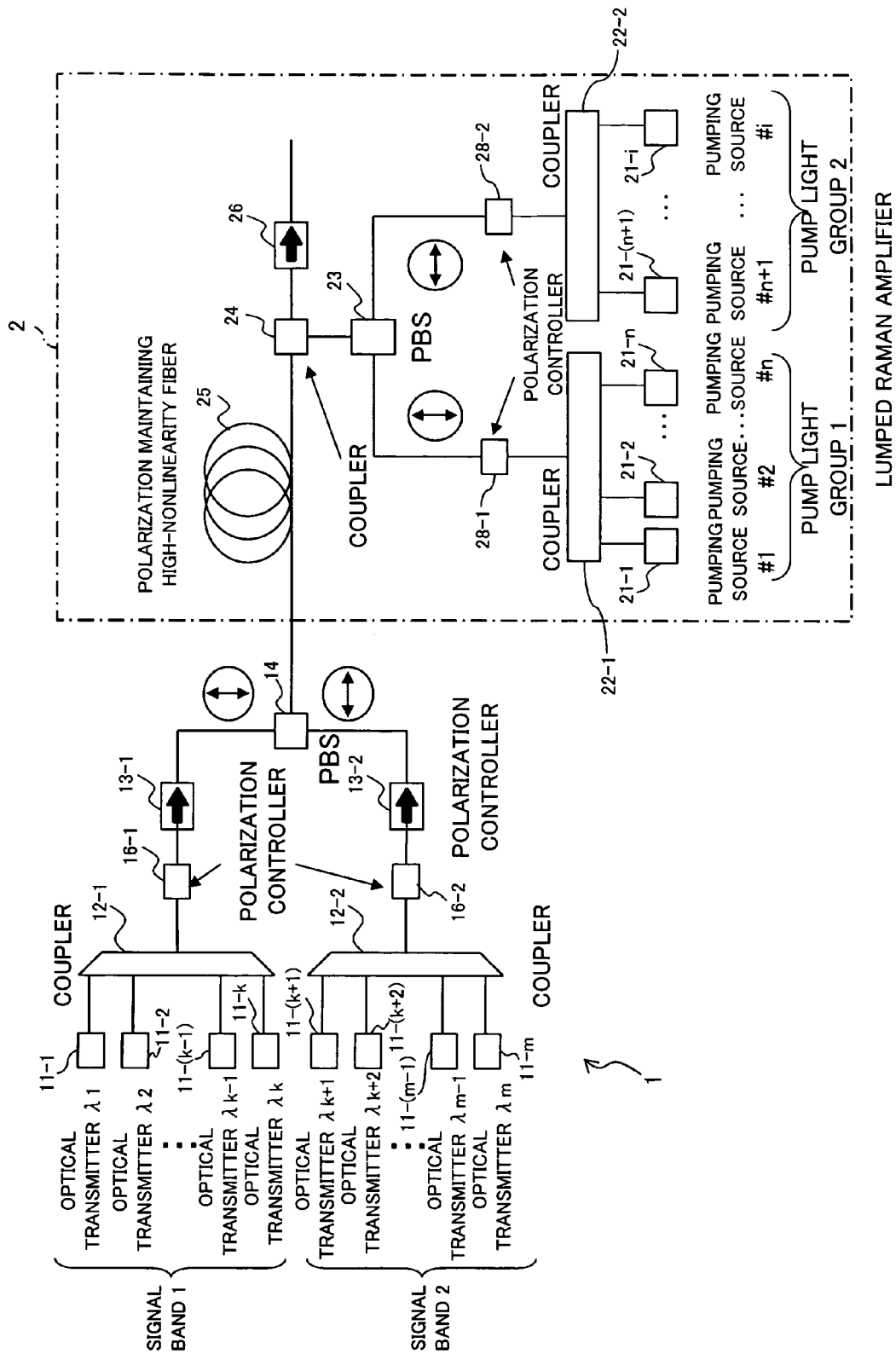
FIG. 7 is a block diagram showing a structure of a WDM transmission system according to a first modification of the second embodiment.

FIG. 7 is a block diagram showing a structure of a WDM transmission system according to a first modification of the second embodiment. The system shown in FIG. 7 differs from the system shown in FIG. 5 in that polarization controllers (first and second polarization controllers) are disposed on not the input's side but the output's side of the respective couplers 12-1 and 12-2 in the optical transmission node 1, and polarization controllers (first and second polarization controllers) 28-1 and 28-2 controlling polarizations of output lights from the couplers 22-1 and 22-2 are disposed on not the input's side but the output's side of the respective couplers 22-1 and 22-2 in the Raman amplifier 2. Incidentally, other structural components are the same as or similar to those described above unless specifically mentioned.

In the system according to this modification, each of the polarization controllers 16-1, 16-2, 28-1 and 28-2 functions as a polarization controlling means for controlling a polarizing angle which is formed by a signal light and a pump light, which collectively controls a polarization in a signal band or a pump light group as a unit, not controlling the polarization of each signal light in the signal bands "1" and "2" and the polarization of each pump light in the pump light groups "1" and "2."

In this modification, by controlling the polarization controllers 16-1, 16-2, 28-1 and 28-2, it becomes possible to control a polarizing angle formed by the polarization of signal lights and the polarization of pump lights to decrease the gain of signal lights in one signal band "1" or "2", while increasing (or not changing) the gain of signal lights in the other signal band "2" or "1," like the above second embodiment.

This modification can largely decrease the number of necessary polarization controllers although it has less accuracy and freedom of polarization control, thus is advantageous with respect to the apparatus size and cost.

In the system structure shown in FIG. 7, the polarization controller is provided to each of the signal bands and the pump light groups. However, either one of the optical transmission node 1 or the Raman amplifier 2 may have the structure shown in FIG. 5, that is, the polarization controller may be provided to each of the signal bands in the optical transmission node 1 or to each of the pump light groups in the Raman amplifier 2. In the system structure shown in FIGS. 5 and 7, the polarization controllers are provided to both the optical transmission node 1 and the Raman amplifier 2. However, even if the polarization controllers are provided to either one of the optical transmission node 1 or the Raman amplifier 2, it is possible to control a polarizing angle formed by the polarization of signal lights and the polarization of pump lights.

(B2) Description of Second Modification

Figure 8:
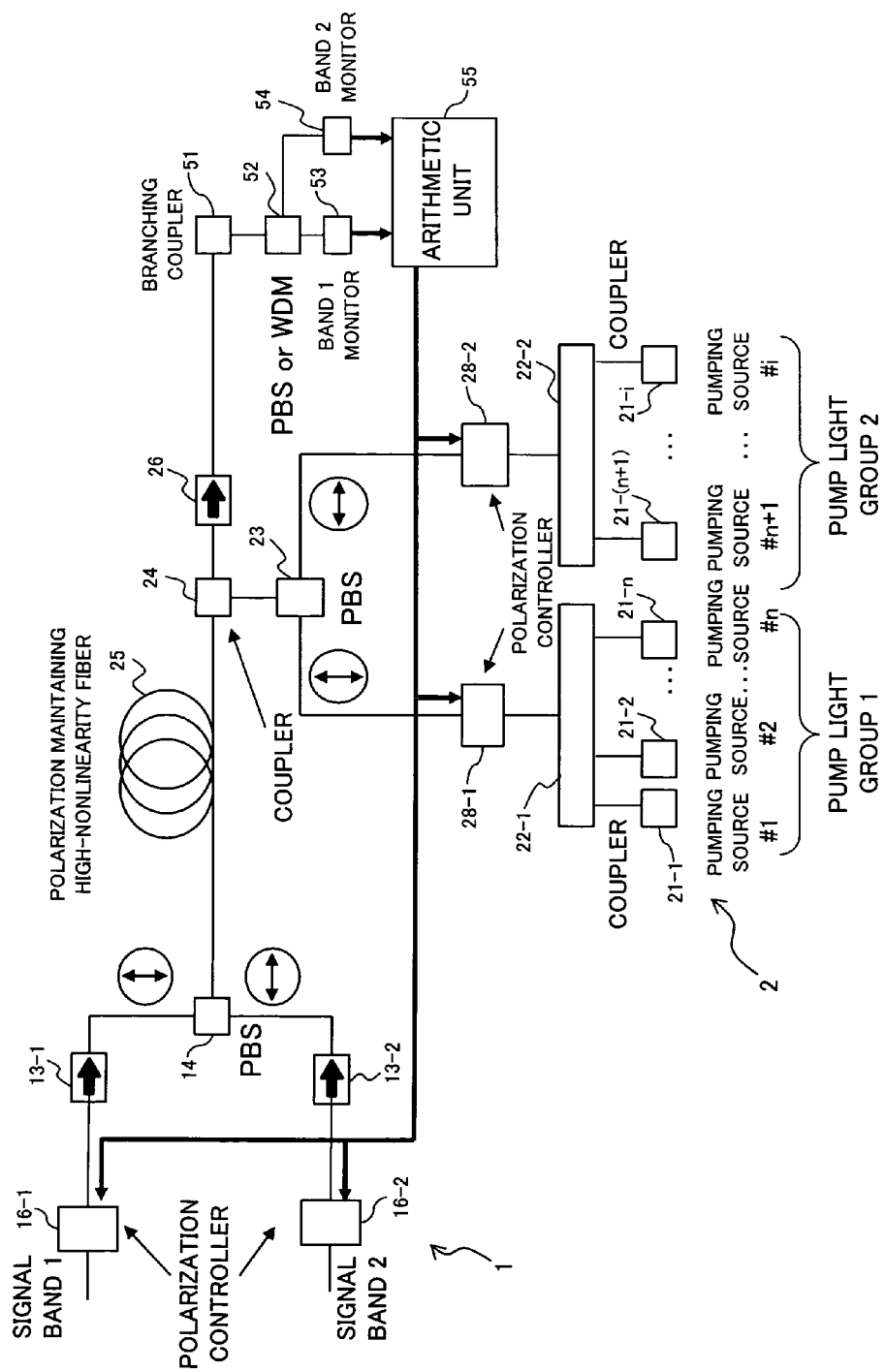
FIG. 8 is a block diagram showing a structure of a WDM transmission system according to a second modification of the second embodiment.

In the system described above with reference to FIG. 7, the control on the polarization controllers 16-1, 16-2, 28-1 and 28-2 can be done by monitoring the power of each signal light in the signal bands "1" and "2" on the output's side of the Raman amplifier 2, and determining a control quantity for each of the polarization controllers 16-1, 16-2, 28-1 and 28-2 on the basis of a result of the monitoring, as shown in FIG. 8, for example.

On the output's side of the Raman amplifier 2, there are further provided a branching coupler 51 branching a part of an output light from the Raman amplifier 2 as a monitor light, a polarization beam splitter (or a demultiplexer) 52 demultiplexes the monitor light into the signal bands "1" and "2," light receiving elements 53 and 54 such as PIN photodiodes or the like receiving the monitor lights in the signal bands "1" and "2" and outputting electric signals according to their quantities of received light, and an arithmetic unit 55 determining control quantities for the polarization controllers 16-1, 16-2, 28-1 and 28-2 in arithmetic operation on the basis of outputs from the light receiving elements 53 and 54.

According to this modification, as the polarization control unit, there are provided the branching coupler 51 and the light receiving elements 53 and 54 as a monitoring unit for monitoring each of the signal light groups of the signal bands "1" and "2" from the output light of the polarization maintaining fiber 25, and the arithmetic unit 55 as a control unit for generating control signals for the polarization controllers 16-1, 16-2, 28-1 and 28-2 on the basis of a result of the monitoring by the monitoring unit.

When a target gain (optical power) of each of the signal bands "1" and "2" is set in the arithmetic unit 55, the arithmetic unit 55 adaptively determines a control quantity required by each of the polarization controllers 16-1, 16-2, 28-1 and 28-2 so that a difference (error) between the signal band "1" or "2" and the target gain becomes null, whereby the polarization controllers 16-1, 16-2, 28-1 and 28-2 are adaptively controlled. This controlling method can be applied to the system structure described above with reference to FIG. 5, of course.

(C) Description of Third Embodiment

Figure 9:
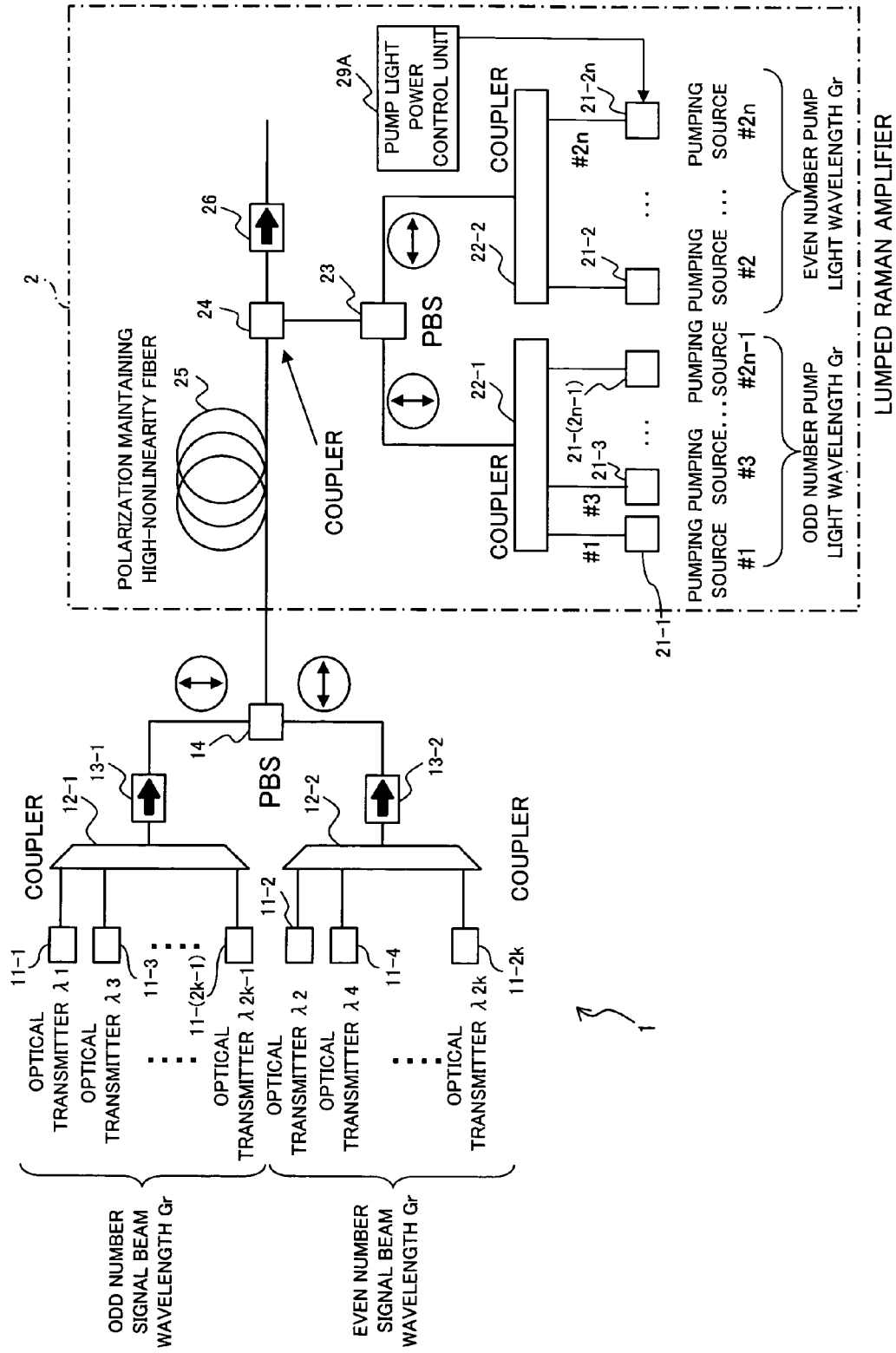
FIG. 9 is a block diagram showing a structure of a WDM transmission system according to a third embodiment of this invention.

FIG. 9 is a block diagram showing a structure of a WDM transmission system according to a third embodiment of this invention. The system shown in FIG. 9 differs from the structure shown in FIG. 1 in that, in the optical transmission node 1, the optical transmitters 1 through m are grouped into an odd number signal wavelength group [λ1, λ3, ... and λ(2k-1)] made up of optical transmitters 11-1, 11-3 ... and 11-(2k-1), and an even number signal optical wavelength group (λ2, λ4, ... and λ2k) made up of optical transmitters 11-2, 11-4 ... and 11-2k, the polarization of the odd number signal optical wavelength group and the polarization of the even number signal wavelength group are made orthogonal, and signal lights at the odd wavelengths are coupled by the coupler 12-1, whereas signal lights at odd wavelengths are coupled by the coupler 12-2.

Secondary, the system shown in FIG. 9 differs from the system shown in FIG. 1 in that, in the Raman amplifier 2, the pumping sources 21-1 through 21-2n are grouped into an odd number pump light wavelength group made up of pumping sources 21-1, 21-3 ... and 21-(2n-1), and an even number pump light wavelength group made up of pumping sources 21-2, 21-4 ... and 21-2n, the polarization of the odd number pump light wavelength group and the polarization of the odd number signal optical wavelength group are matched with each other, the polarization of the even number pump light wavelength group and the polarization of the even number pump light wavelength group are matched with each other, and the pump lights #1, #3 ... and #2n-1 at odd number wavelengths are coupled by the coupler 22-1, whereas pump lights #2, #4 ... and #2n at even number wavelengths are coupled by the coupler 22-2.

Each of the pump lights #1 through #2n is at a position shifted away from the wavelength arranged position of a corresponding signal light toward the shorter wavelength by about 13.2 THz (100 nm), for example.

Figure 10:
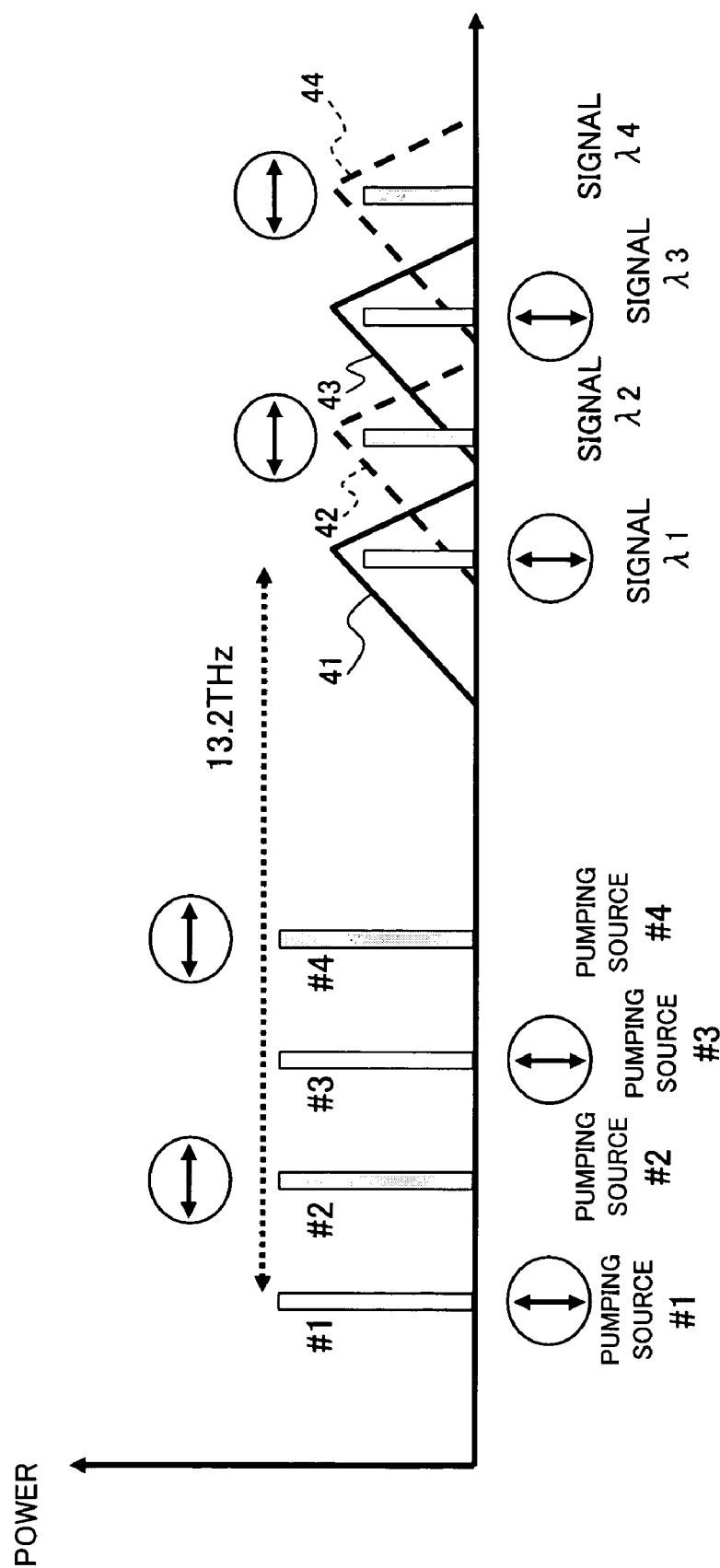
FIG. 10 is a schematic diagram showing an example of wavelength arrangement of signal lights and pump lights and a state of polarization thereof in the WDM transmission system shown in FIG. 9.

In the WDM transmission system structured as above according to this embodiment, each signal light in the odd number signal optical wavelength group and each signal light in the even number signal optical number group having the polarization 90 degree away from that of the former signal light are alternately arranged in the polarization maintaining fiber 25, and each of the pump light wavelengths is set at a position shifted away from the wavelength arranged position of a corresponding signal light toward the shorter wavelength by about 13.2 THz (100 nm) so that the gain peak brought by the pump light can be obtained at the wavelength arranged position of the signal light, as schematically shown in FIG. 10, for example.

In FIG. 10, a solid line 41 represents the gain characteristic of a pump light #1, a broken line 42 the gain characteristic of a pump light #2, a solid line 43 the gain characteristic of a pump light #3 and a broken line 44 the gain characteristic of a pump light #4. In this case, a predetermined wavelength spacing is provided between the signal light and the pump light in order to prevent not less than two signal lights having the same polarization from being amplified by the gain characteristic of one pump light.

Figure 11:
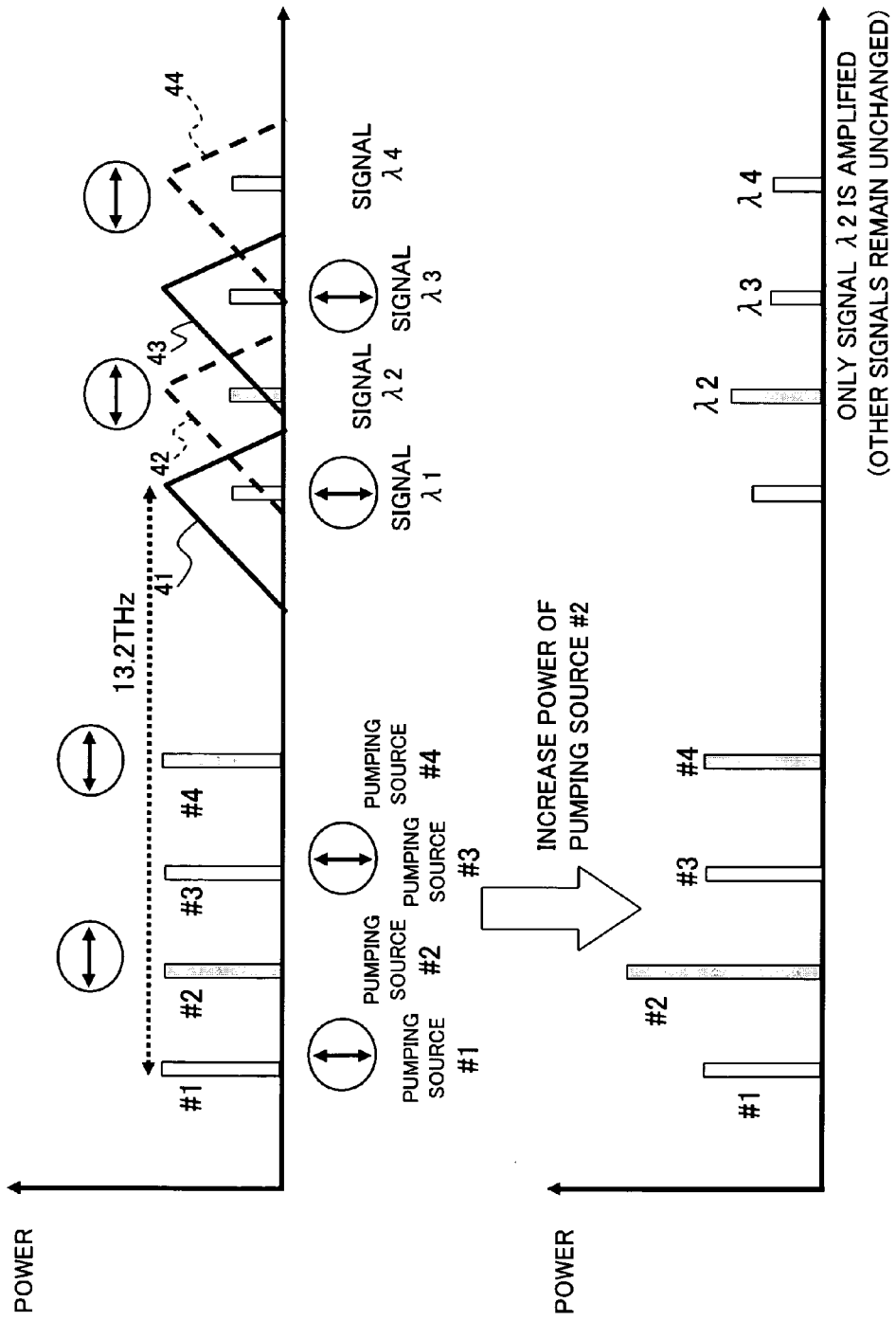
FIG. 11 is a schematic diagram showing an example of a change in gain characteristic by a pump light power control in the WDM transmission system shown in FIG. 9.

As schematically shown in FIG. 11, for example, when the output power of the pumping source 21-2 is controlled (increased) by the pump light power control unit 29A to increase the power of the pump light #2, only the signal light λ2 having the polarization coinciding with the polarization of the pump light #2, which is present within the gain characteristic (gain band) 42 brought by the pump light #2, is amplified due to the stimulated Raman scattering effect, whereas the gains of the other signal lights λ1, λ3 and λ4 remain unchanged so long as the signal lights λ1, λ3 and λ4 are not at wavelength positions that are not affected by the gain characteristic 42 of the pump light #2. Why the signal light λ4 having the same polarization as the pump light #2 is not amplified is that the spacing between the wavelengths is set so that the signal light λ4 is not amplified by the gain characteristic 42 of the pump light #2, as stated above. When it is desired to control the power of only the other signal light λ1, λ3 or λ4, controlling the power of only the corresponding pump light #1, #3 or #4 suffices.

According to this embodiment, it is possible to control the gain of each signal light at a certain wavelength simply and independently without affecting other wavelengths, by controlling the power of a pump light having the same polarization as the signal light.

In this case, the pump light power control by the pump light power control unit 29A may be performed according to external setting from a maintenance console or the like. Alternatively, each of the signal bands "1" and "2" in an output light from the Raman optical amplifier 2 may be monitored, and the pump light power control may be performed automatically and adaptively according to a result of the monitoring.

(C1) Description of Modification

Figure 12:
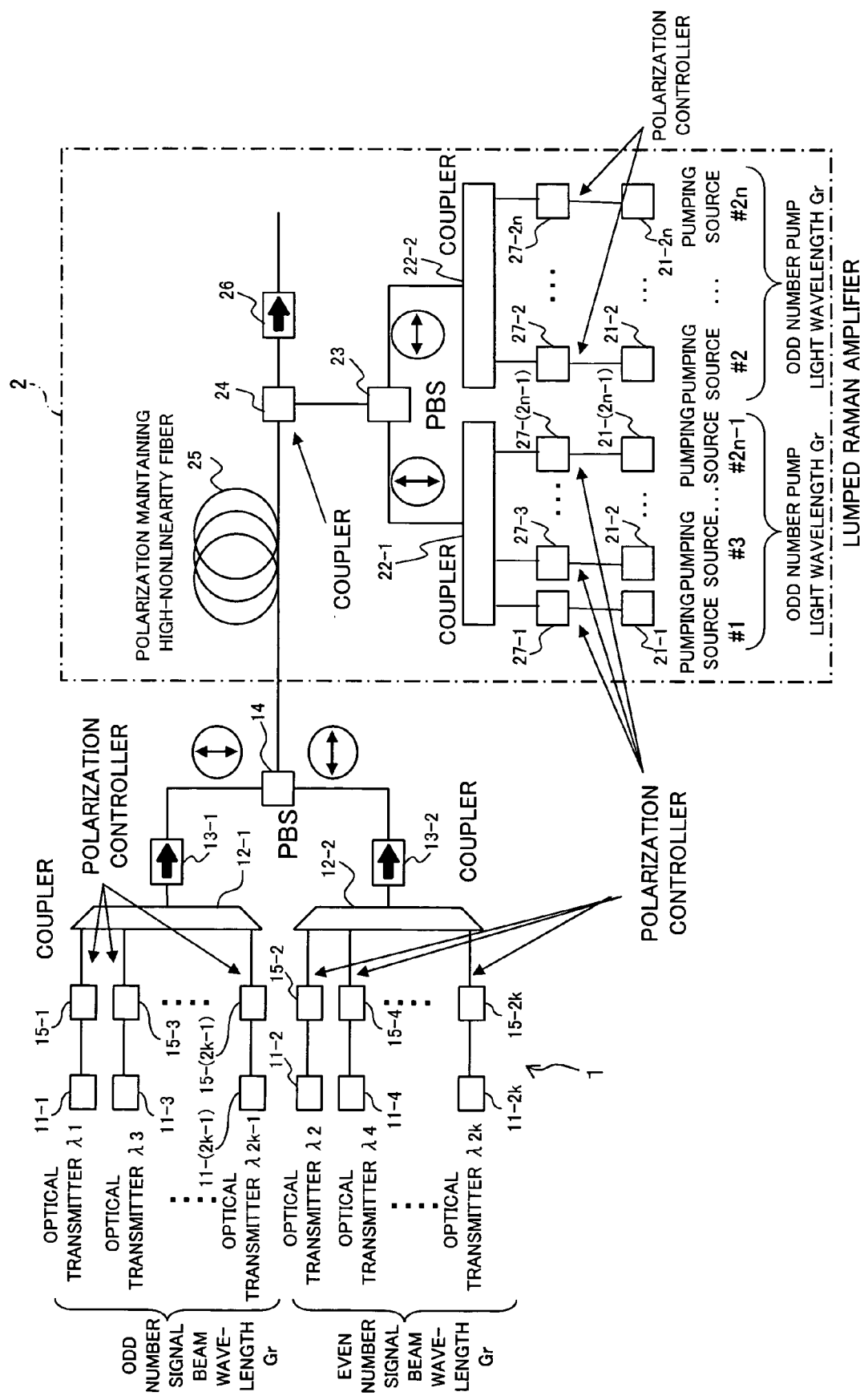
FIG. 12 is a block diagram showing a structure of a WDM transmission system according to a modification of the third embodiment.

FIG. 12 is a block diagram showing a structure of a WDM transmission system according to a modification of the third embodiment described above. The system shown in FIG. 12 differs in structure from the system shown in FIG. 9 in that polarization controllers 15-1 through 15-2k for adjusting the states of polarization of signal lights outputted from the optical transmitters 11-1 through 11-2k before the signal lights are coupled by the couplers 12-1 and 12-2 are provided in the optical transmission node 1, and polarization controllers 27-1 through 27-2n for adjusting pump lights #1n through #2n from the pumping sources 21-1 through 21-2n before the pump lights are coupled by the couplers 22-1 and 22-2 are provided in the Raman amplifier 2, like the system structure shown in FIG. 5. Incidentally, like reference characters designate like or corresponding parts described above.

In the initial state, the states of polarization of the odd number signal light wavelength group and the even number signal wavelength group are set so that signal lights in the odd number signal light wavelength group are amplified with pump lights in the odd number pump light wavelength group, whereas signal lights in the even number signal wavelength group are amplified with pump lights in the even number pump light wavelength group whose polarization is orthogonal to the polarization of the odd number pump light wavelength group.

In such state, when only the polarization of the pump light #2 is controlled by the polarization controller 27-2, for example, the generation efficiency of the stimulated Raman scattering drops from the peak because the polarization of the pump light #2 shifts from the coincident state with the polarization of the signal light λ2 to be amplified, the gain of the signal light λ2 is thus decreased. On the other hand, the polarization of a signal light present within the gain characteristic 42 (refer to FIG. 11) of the pump light #2 among the neighboring other signal lights λ1 and λ3 which are in the orthogonal relationship with the polarization of the pump light #2 comes out of the orthogonal relationship of the polarization with the pump light #2, thus the generation efficiency of the stimulated Raman scattering does not become null, which results in an increase in the gain of that signal light. This applies when the state of polarization of another pump light is controlled. By controlling the state of polarization of not a pump light but a signal light to change the coincident state and the orthogonal relationship between the signal light and the pump light, it is possible to simply control the gain of the signal light.

According to this embodiment, it is possible to simply control the gain of a signal light at a specific wavelength by controlling a polarizing angle formed by the signal light at a certain wavelength and a corresponding pump light to break the coincide state or the orthogonal relationship of the polarization between the signal light and the pump light.

The polarization control in this case can be adaptively performed by applying a manner similar to that described above with reference to FIG. 8, as well.

(D) Others

In the above embodiments, the gain control on a signal light is performed by controlling either the pump light power or the polarizing angle. However, both of the pump light power and the polarizing angle may be controlled.

In the above examples, the signal band is divided into two. However, the signal band may be divided into three or more. In such case, the polarizations of neighboring signal bands of signal lights are made orthogonal, and the polarization of the signal lights is matched with the polarization of corresponding pump lights in each of the signal band, whereby the same or similar working functions can be obtained.

In the above examples, an input light inputted to the polarization maintaining fiber 25 as being an amplification medium is a signal light, that is, a modulated signal light. However, the present invention is not limited to this. However, this invention can be applied to a case in which the inputted light is a light other than the signal light such as a carrier light, a pilot light or the like, and can provide the same working function as above.

In the above examples, two or more pump lights are prepared to amplify the signal band "1" ("2"). However, only one pump light can be used to amplify a plurality of lights in a certain signal band (it is not always necessary to prepare more than one pump lights).

It is most preferable that polarizations of the pair of pump lights are orthogonal to each other, and that polarizations of the pair of signal lights are also orthogonal to each other. However, if each of the pump lights and its corresponding signal light, which is to be amplified with the pump light, have polarizations identical to each other, such orthogonal relationships between the pump light pair and between the signal light pair are not always necessary.

The present invention is not limited to the above examples, but may be modified in various ways without departing from the scope of the invention, as a matter of course.

As described above in detail, this invention can provide a Raman optical amplifier and an optical transmission system which can control, simply and independently, the gain of a wavelength or a wavelength band of a specific input light by controlling the pump light power or the polarizing angle formed by the input light and the pump light, without affecting the other wavelengths or wavelength bands. Therefore, this invention is very useful in the field of optical communication techniques.

What is claimed is:

1. A Raman optical amplifier comprising:
an amplification medium inputted a first light, that has a first wavelength and is polarized in a first plane of polarization, and a second light, that has a second wavelength different from the first wavelength and is polarized in a second plane of polarization substantially orthogonal to the first plane of polarization; and
a pumping device inputting, to said amplification medium, a first pump light, for amplifying the first light and that is polarized in a third plane of polarization which coincides with the first plane of polarization, and a second pump light, for amplifying the second light and that is polarized in a fourth plane of polarization which coincides with the second plane of polarization,
wherein said amplification medium is a polarization maintaining fiber maintaining states of polarization of the first light, the second light, the first pump light and the second pump light.

2. The Raman optical amplifier according to claim 1 further comprising:
a pump light power controller controlling an output power of each of said pump lights.

3. The Raman optical amplifier according to claim 1 further comprising:
a polarization controlling device controlling a polarizing angle formed by said first light and said first pump light and a polarizing angle formed by said second light and said second pump light.

4. The Raman optical amplifier according to claim 3, wherein
said pumping device comprises:
a first pumping source outputting said first pump light;
a second pumping source outputting said second pump light;
a polarization combiner combining output lights of said pumping sources while keeping polarizations thereof; and
a coupler introducing an output light of said polarization combiner to said
amplification medium;
said polarization controlling device comprises:
a polarization controller disposed to each of said pumping sources.

5. The Raman optical amplifier according to claim 3, wherein
said pumping device comprises:
a plurality of first pumping sources outputting a plurality of said first pump lights;
a plurality of second pumping sources outputting a plurality of said second pump lights;
a first coupler coupling output lights of said first pumping sources;
a second coupler coupling output lights of said second pumping sources;
a polarization combiner combining output lights of said couplers while keeping polarizations thereof; and
a third coupler introducing an output light of said polarization combiner into said amplification medium;

said polarization controlling device comprises:
a first polarization controller controlling a polarization of the output light of said first coupler;
a second polarization controller controlling a polarization of the output light of said second coupler.

6. The Raman optical amplifier according to claim 3, wherein said polarization controlling device comprises:
a monitoring unit monitoring each of said first light and said second light in an output light of said amplification medium; and
a controlling unit generating control signals for said polarization controlling device on the basis of a result of monitoring by said monitoring unit.

7. A Raman optical amplifier comprising:
an amplification medium inputted a first light group of first lights having different wavelengths in a first wavelength band and being polarized in a first plane of polarization, and a second light group of second lights having different wavelengths in a second wavelength band and being polarized in a second plane of polarization substantially orthogonal to the first plane of polarization; and
a pumping device inputting, to said amplification medium, a first pump light, for amplifying the first light group and that is polarized in a third plane of polarization which coincides with the first plane of polarization, and a second pump light for amplifying the second light group and that is polarized in a fourth plane of polarization which coincides with the second plane of polarization,
wherein the amplification medium is a polarization maintaining fiber maintaining states of polarization of the first lights, the second lights, the first pump light, and the second pump light.

8. The Raman optical amplifier according to claim 7, wherein said pumping device inputs a plurality of said first pump lights and a plurality of said second pump lights to said amplification medium.

9. The Raman optical amplifier according to claim 8 further comprising:
a pump light power controlling device controlling an output power of each of said pump lights.

10. The Raman optical amplifier according to claim 8 further comprising:
a polarization controlling device controlling a polarizing angle formed by said first light group and said first pump light and a polarizing angle formed by said second light group and said second pump light.

11. The Raman optical amplifier according to claim 7 further comprising:
a pump light power controller controlling an output power of each of said pump lights.

12. The Raman optical amplifier according to claim 7 further comprising:
a polarization controlling device controlling a polarizing angle formed by said first light group and said first pump light and a polarizing angle formed by said second light group and said second pump light.

13. The Raman optical amplifier according to claim 12, wherein
said pumping device comprises:
a first pumping source outputting said first pump light;
a second pumping source outputting said second pump light;
a polarization combiner combining output lights of said pumping sources while keeping polarizations thereof; and a coupler introducing an output light of said polarization combiner to said amplification medium;

said polarization controlling device comprises:
a polarization controller disposed to each of said pumping sources.

14. The Raman optical amplifier according to claim 12, wherein
said pumping device comprises:
a plurality of first pumping sources outputting a plurality of said first pump lights;
a plurality of second pumping sources outputting a plurality of said second pump lights;
a first coupler coupling output lights of said first pumping sources;
a second coupler coupling output lights of said second pumping sources;
a polarization combiner combining output lights of said couplers while keeping polarizations thereof; and
a third coupler introducing an output light of said polarization combiner into said amplification medium;
said polarization controlling device comprises:
a first polarization controller controlling a polarization of the output light of said first coupler, and
a second polarization controller controlling a polarization of the output light of said second coupler.

15. The Raman optical amplifier according to claim 12, wherein said polarization controlling device comprises:
a monitoring unit monitoring each of said first light group and said second light group in an output light of said amplification medium; and
a controlling unit generating control signals for said polarization controllers on the basis of a result of monitoring by said monitoring unit.

16. An optical transmission system using a Raman optical amplifier comprising:
an optical transmitting apparatus for transmitting a first light, that has a first wavelength and is polarized in a first plane of polarization, and a second light, that has a second wavelength different from the first wavelength and is polarized in a second plane of polarization substantially orthogonal to the first plane of polarization; and
said Raman optical amplifier comprising:
an amplification medium inputted said first and second lights from said optical transmitting apparatus; and
a pumping device inputting, to said amplification medium, a first pump light for amplifying the first light and that is polarized in a third plane of polarization which coincides with the first plane of polarization, and a second pump light for amplifying the second light and that is polarized in a fourth plane of polarization which coincides with the second plane of polarization,
wherein said amplification medium is a polarization maintaining fiber maintaining states of polarization of the first light, the second light, the first pump light and the second pump light.

17. The optical transmission system using a Raman optical amplifier according to claim 16, wherein said Raman optical amplifier comprises:
a pump light power controlling device controlling an output power of each of said pump lights.

18. The optical transmission system using a Raman optical amplifier according to claim 16 further comprising:
a polarization controlling device controlling a polarizing angle formed by said first light and said first pump light, and a polarizing angle formed by said second light and said second pump light.

19. The optical transmission system using a Raman optical amplifier according to claim 18, wherein said polarization controlling device comprises:
a first optical polarization controller controlling a polarization of said first light; and
a second optical polarization controller controlling a polarization of said second light;
said first optical polarization controller and said second optical controller being disposed in said optical transmitting apparatus.

20. The optical transmission system using a Raman optical amplifier according to claim 18, wherein said polarization controlling device comprises:
a first pump light polarization controller controlling a polarization of said first pump light; and
a second pump light polarization controller controlling a polarization of said second pump light;
said first pump light polarization controller and said second pump light polarization controller being disposed in said Raman optical amplifier.

21. An optical transmission system using a Raman optical amplifier according to claim 16, further comprising:
a transmission fiber between the optical transmitting apparatus and the Raman optical amplifier, wherein the optical transmitting apparatus transmits the first and second lights to the transmission fiber, and the first and second lights are inputted to the amplification medium of the Raman optical amplifier after being received by the Raman optical amplifier from the transmission fiber.

22. An optical transmission system using a Raman optical amplifier comprising:
an optical transmitting apparatus transmitting a first light group of first lights having different wavelengths in a first wavelength band and being polarized in a first plane of polarization, and a second light group of second lights having different wavelengths in a second wavelength band and being polarized in a second plane of polarization substantially orthogonal to the first plane of polarization;
said Raman optical amplifier comprising:
an amplification medium inputted said first and second light groups from said optical transmitting apparatus; and
a pumping device inputting, to said amplification medium, a first pump light, for amplifying the first light group and that is polarized in a third plane of polarization which coincides with the first plane of polarization, and a second pump light for amplifying the second light group and that is polarized in a fourth plane of polarization which coincides with the second plane of polarization,
wherein said amplification medium is a polarization maintaining fiber maintaining states of polarization of said first lights, said second lights, said first pump light and said second pump light.

23. The optical transmission system using a Raman optical amplifier according to claim 22, wherein said pumping device inputs a plurality of said first pump lights and a plurality of said second pump lights to said amplification medium.

24. The optical transmission system using a Raman optical amplifier according to claim 23 further comprising:
a polarization controlling device controlling a polarizing angle formed by said first light group and said first pump light, and a polarizing angle formed by said second light group and said second pump light.

25. The optical transmission system using a Raman optical amplifier according to claim 22 further comprising:
a polarization controlling device controlling a polarizing angle formed by said first light group and said first pump light, and a polarizing angle formed by said second light group and said second pump light.

26. The optical transmission system using a Raman optical amplifier according to claim 25, wherein said polarization controlling device comprises:
a first optical polarization controller controlling a polarization of said first light group; and
a second optical polarization controller controlling a polarization of said second light group;
said first optical polarization controller and said second optical controller being disposed in said optical transmitting apparatus.

27. The optical transmission system using a Raman optical amplifier according to claim 25, wherein said polarization controlling device comprises:
a first pump light polarization controller controlling a polarization of said first pump light; and
a second pump light polarization controller controlling a polarization of said second pump light;
said first pump light polarization controller and said second pump light polarization controller being disposed in said Raman optical amplifier.

28. An optical transmission system using a Raman optical amplifier according to claim 22, further comprising:
a transmission fiber between the optical transmitting apparatus and the Raman optical amplifier, wherein the optical transmitting apparatus transmits the first and second light groups to the transmission fiber, and the first and second light groups are inputted to the amplification medium of the Raman optical amplifier after being received by the Raman optical amplifier from the transmission fiber.

29. A Raman optical amplification method comprising:
inputting, to an amplification medium, a first light that has a first wavelength and is polarized in a first plane of polarization and a second light that has a second wavelength different from the first wavelength and is polarized in a second plane of polarization substantially orthogonal to the first plane of polarization;
inputting, to the amplification medium, a first pump light for amplifying the first light and that is polarized in a third plane of polarization which coincides with the first plane of polarization, and a second pump light for amplifying the second light and that is polarized in a fourth plane of polarization which coincides with the second plane of polarization; and
controlling gains of said first and second lights by controlling output powers of said pump lights,
wherein the amplification medium is a polarization maintaining fiber maintaining states of polarization of the first light, the second light, the first pump light and the second pump light.

30. An apparatus comprising:
an optical amplification medium provided with a first signal light at a first wavelength and polarized in a first plane of polarization, a second signal light at a second wavelength different from the first wavelength and polarized in a second plane of polarization substantially orthogonal to the first plane of polarization, a first pump light polarized in a third plane of polarization which coincides with the first plane of polarization, and a second pump light polarized in a fourth plane of polarization which coincides with the second plane of polarization, wherein the provided first and second signal lights travel through the amplification medium,
the provided first pump light causes the first signal light to be Raman amplified as the first signal light travels through the amplification medium, and
the provided second pump light causes the second signal light to be Raman amplified as the second signal light travels through the amplification medium,
wherein the amplification medium is a polarization maintaining fiber maintaining states of polarization of the first signal light, the second signal light, the first pump light and the second pump light.

31. An apparatus comprising:
an optical amplification medium; and
means for providing the amplification medium with a first signal light at a first wavelength and polarized in a first plane of polarization, a second signal light at a second wavelength different from the first wavelength and polarized in a second plane of polarization substantially orthogonal to the first plane of polarization, a first pump light polarized in a third plane of polarization which coincides with the first plane of polarization, and a second pump light polarized in a fourth plane of polarization which coincides with the second plane of polarization, wherein
the provided first and second signal lights travel through the amplification medium,
the provided first pump light causes the first signal light to be Raman amplified as the first signal light travels through the amplification medium, and
the provided second pump light causes the second signal light to be Raman amplified as the second signal light travels through the amplification medium,
wherein the amplification medium is a polarization maintaining fiber maintaining states of polarization of the first signal light, the second signal light, the first pump light and the second pump light.

* * * * *